US007560130B2

(12) United States Patent
Bavan

(10) Patent No.: US 7,560,130 B2
(45) Date of Patent: Jul. 14, 2009

(54) HOT WATER SOLUBLE INSTANT TEA AND METHOD FOR THE PRODUCTION OF SAME

(75) Inventor: Devarayan Sivanarul Bavan, West Bengal (IN)

(73) Assignee: Goodricke Group Limited, Kolkata (IN)

( * ) Notice: Subject to any disclaimer, the term of this patent is extended or adjusted under 35 U.S.C. 154(b) by 788 days.

(21) Appl. No.: 10/482,923

(22) PCT Filed: May 30, 2002

(86) PCT No.: PCT/IB02/01816

§ 371 (c)(1),
(2), (4) Date: Nov. 22, 2004

(87) PCT Pub. No.: WO03/101215

PCT Pub. Date: Dec. 11, 2003

(65) Prior Publication Data

US 2005/0084566 A1    Apr. 21, 2005

(51) Int. Cl.
*A23F 3/00*   (2006.01)
(52) U.S. Cl. ..................... 426/597; 426/435
(58) Field of Classification Search .......... 426/597, 426/435
See application file for complete search history.

(56) References Cited

U.S. PATENT DOCUMENTS

| 2,891,865 | A | * | 6/1959 | Seltzer et al. | 426/435 |
| 3,163,539 | A | * | 12/1964 | Barch | 426/271 |
| 3,531,296 | A | * | 9/1970 | Smithies | 426/271 |
| 3,821,440 | A | * | 6/1974 | Reeve | 426/312 |
| 4,315,036 | A | * | 2/1982 | Husaini et al. | 426/387 |
| 4,472,441 | A | * | 9/1984 | Clark et al. | 426/387 |
| 4,851,252 | A | * | 7/1989 | Greither et al. | 426/599 |
| 5,445,836 | A | * | 8/1995 | Agbo et al. | 426/52 |
| 6,296,887 | B1 | * | 10/2001 | Mehta et al. | 426/435 |
| 6,413,570 | B1 | * | 7/2002 | Lehmberg et al. | 426/597 |

FOREIGN PATENT DOCUMENTS

JP    59-227243    * 12/1984

* cited by examiner

*Primary Examiner*—Anthony Weier
(74) *Attorney, Agent, or Firm*—Harold L. Novick; The Nath Law Group

(57) ABSTRACT

The present invention relates to hot water soluble instant tea and provides a method for preparing an extract, concentrate or powder, which is capable of being reconstituted as a tea beverage, having excellent organoleptic properties and substantially free of undesirable cloudiness and haze, and resembling conventional tea in taste and character.

9 Claims, No Drawings

HOT WATER SOLUBLE INSTANT TEA AND METHOD FOR THE PRODUCTION OF SAME

TECHNICAL FIELD

The present invention relates to hot water soluble instant tea. More particularly, the invention provides a method for preparing an extract, concentrate or powder, which is capable of being reconstituted to a tea beverage, having excellent organoleptic properties and substantially free of undesirable cloudiness and haze. The instant tea of the invention resembles conventional tea in taste and character.

BACKGROUND ART

Black tea is generally prepared by subjecting green tea leaves to various process conditions such as withering, rolling, disintegrating, fermenting, firing etc., during which enzymatic reactions are initiated in the tea leaves and the characteristic aroma, colour and flavour of black tea are developed. Black tea extract is produced by treating black tea leaves with warm water. The extract produced contain soluble tea solids as well as insoluble solids. The insoluble solids are discarded and the supernatant is processed further to recover any left over desirable tea properties such as flavor, aroma etc.

The characteristic feature of tea depends on the quantity and type of polyphenols present in tea, which make up of 20-35% of total dry weight of freshly plucked leaves. Approximately 70% of the polyphenols in the tea leaves are fermentable and take part in the chemical changes that take place during tea manufacture. The most important of the polyphenols, as far as quality of tea goes, are the epi-gallo catechin and gallates.

The supernatant left after removal of tea solids is concentrated, dried and sold as powder. Such a powder may be instantly soluble in hot water or cold water, as the case may be. This generally is the traditional method of tea manufacture.

One of the most serious problems faced by instant tea manufacturers is that the tea powder prepared according to traditional methods, when reconstituted tends to lose the characteristic flavour and aroma of fresh black tea. The reconstituted tea reacts badly to milk and tends to take a dull coloration. The characteristic aroma associated with black tea is lost during various stages of processing. Ideally, hot water soluble instant tea should resemble black tea infusion to the extent possible. However, little amount of cloudiness and haze could be present in the tea.

However, the prior art does not yet provide a cost effective and simple method for the production of instant hot tea. And, it is desirable to provide an instant tea product, which when reconstituted in hot water retains characteristic aroma and other organoleptic properties of tea.

The applicant's studies have shown that the water used for tea extraction plays a crucial role, especially in the stage prior to stripping the black tea extract of its aroma and prior to reconstitution. The Applicant has found that the process must be modified and similarly, before the volatile aroma constituents are incorporated into the tea extract, they must be processed.

OBJECTS OF THE INVENTION

The major object of this invention is to prepare tea which is readily soluble in hot water and provide a method therefor.

Another object is to prepare instant tea product which when reconstituted in hot water is substantially free of undesired turbidity.

Still another object is to prepare instant tea which when reconstituted in warm water retains the aroma and characteristic organoleptic properties associated with fresh black tea.

Yet another object of the invention is to provide instant tea which when reconstituted in hot water retains the characteristic aroma and organoleptic properties of tea.

DETAILED DESCRIPTION

Accordingly, the invention provides a novel method for the production of instant tea which When reconstituted in hot water, exhibits the characteristic aroma and the organoleptic properties of black tea. Further, the beverage so produced is substantially free of undesired cloudiness and turbidity.

The invention provides a method for the production of hot water soluble instant tea, said method comprising the steps of:
(a) forming an extract by treating black tea leaves with hard warm water at a temperature in the range of 60 to 105° C.
(b) stripping the extract of its aroma volatiles by passing the tea extract through a flash evaporator under partial vacuum, wherein the residence period is about 30 seconds to 360 seconds,
(c) separating at least about 12% by wt. as insoluble tea solids from the extract by subjecting the extract to repeated clarification and polishing to obtain a clarified concentrate,
(d) separating 6-10% soluble tea solids from the clarified concentrate,
(e) adjusting the pH of the concentrate to neutral by adding an edible acid,
(f) adding the aroma volatiles obtained in step (b) to the concentrate, and
(g) obtaining a substantially moisture free tea powder capable of being reconstituted in hot water to produce instant tea, substantially free of cloudiness and haze.

In an embodiment, the tea leaves are selected from oolong or black tea leaves.

In another embodiment, the tea leaves are extracted with hard warm water containing calcium and magnesium salts and having hardness of 10 to 140 ppm and pH of 6.8 to 7.2.

In an embodiment, the extraction of tea leaves is effected at a temperature in the range of 80 to 100° C.

In still another embodiment, the ratio of water to tea leaves is 1:10.

In yet another embodiment, the step of polishing includes subjecting the extract of step (c) to repeated centrifugation at an optimum speed of 3000 to 5000 rpm.

In an embodiment, the edible acid is selected from citric acid, maleic acid or fumaric acid.

In an embodiment, the amount of edible acid added is 0.1% to 1% by wt.

In an embodiment, the concentrate obtained in step (f) and the powder of step (g) may be incorporated with additives acceptable in the food and beverage industry such as cola concentrate.

Thus, the invention provides an instant tea readily soluble in hot water and produced according to the process described above.

To describe the invention in detail, an extract of oolong tea leaves or black tea leaves such as Darjeeling tea leaves (which have been subjected to rolling, withering, fermentation, etc.) is prepared with a suitable solvent. The applicant's studies have revealed that the nature, the quality and type of liquid used for extraction influences the haze and clarity of the final instant tea product. So far, although water was used, there was no emphasis on the quality and type of water used. The quality of water differs at least in chemical content. e.g. hard water contains more of Ca, Mg salts and in soft water these are removed by passing through a sodium resin filter.

The calcium and magnesium salts play a crucial role in the brewing of tea at the end when an infusion of the final product is prepared. Therefore, if soft water, (where water has been passed through a softener) is used, then the salts in it add on to the extract and get carried till the end. The use of soft water also imparts different shades to the milk. Whereas, if hard water (not passed through any softener) having hardness of 10-140 ppm is used, the resultant tea product is far superior. Therefore, in the present case, the solvent is hard warm water. It may have pH of 6.8 to 7.2.

The temperature at which the extract is prepared is also important. The best results are obtained when extraction is effected at 60 to 105° C. The preferred temperature is 80-100° C.

The amount of water in which the tea leaves are immersed can be readily determined by a skilled artisan. However, it is found that when the tea extract may be taken once or twice and it is to be ensured that the ratio of water to tea leaves is taken at 1:10, the extract is superior in quality. The resultant tea extract contains about 8-12% tea solids.

Preferably, the process is a direct counter current extraction with boiling water (1:10::Leaf:Water) The control variables are:
a) diffusion of soluble tea solids across the interphase,
b) volume of water used, which in turn would determine the extent of extraction (lower the concentration of soluble tea solids in the final extract at steady state greater than the extend of extraction,
c) temperature of water used,
d) period of extraction or contact time between the leaf and water, and
e) usage of hard water for extraction.

In this invention, one may preferably use hard water of 60-100 ppm hardness also to extract the tea. The pH of water should be 6.8-7.2. This is ideal for obtaining brightness in the cup.

The next step is the removal of the aromatic volatile components present in the tea extract. For this purpose, the tea extract obtained is passed through a flash evaporator under partial vacuum. The flash evaporators conventionally used in the tea industry may also be used in this invention. The flash evaporator used may preferably be equipped with a recirculation line means and means for reboiling the contents to generate heat for evaporation of volatiles as mentioned earlier. It is to be noted that extracted liquor is flash evaporated before centrifuging and removal of insoluble solids; further, the extract enters the flash evaporator through a heater, raising the temperature between 80-90° C. preferably 90-95° C. Reboiling is done only for circulation to act as a vaporiser.

The whole of extracted decanter liquor is passed through a tubular heater with a provision of re-circulation between 85-95° C. before it is sprayed inside this equipment.

The residence time of the extract in the flash evaporator is about 30 seconds to 360 seconds.

At this juncture, the volatiles in the tea extract such as epigallatones, catechins, tannins are captured and drawn out. As a preferred measure, the extract may be re-boiled and the re-boiled extract may be drawn out, chilled, condensed, distilled and extracted separately. The aromatic volatiles are thus recovered as an aqueous solution having pH of about 7.5 to 8.2.

Once the aromatic volatiles have been separated from the tea extract, the extract is subjected to further processing either chemical or otherwise, to maximize the contents thereof. The extract may be subjected to clarification and repeated polishing preferably by centrifugation at least three to four times so that the insoluble components which result in the cloudiness and turbidity in the final re-constituted beverages may be removed. The resultant concentrate contains soluble solids to the extent of about 12% by wt. This step is carried out at 80-90° C. in a self-ejecting centrifuge.

The extract obtained is pre-evaporated in a falling film evaporator to obtain solids concentration of 6-10% tea solids keeping the outlet temperature as low as possible maximum of 55° C. under 640 mm vacuum pressure. The resultant liquor may contain tea solids to the extent of 6-8% or 6-10%. It is now free of insolubles but lacks the basic characteristics of clear infused liquor.

The liquor is subject further to polishing which involves centrifugation at an optimum space of 3000-5000 rpm. Best results are obtained when centrifugation is carried out with claim extract, at 55 to 70° C. This will enable removal of the solids, without disturbing the basic characteristics thereof.

Polished tea liquor is immediately concentrated in a vacuum evaporator where residence time is shortest. Here a centrifugal evaporator has been used having vacuum of 80 Kpa Prime importance is to maintain a lower outlet temperature and also not to scorch the product by over heating it. The concentrate obtained is used in further steps herebelow.

During these processes, it is necessary to ensure that water which may be present may also be removed therefrom in any appropriate manner.

The aroma volatiles which were removed from the tea extract in the beginning are now mixed with the concentrate. It is often observed in the prior art processes that when this aroma is immediately added to the concentrate, a colour development occurs from reddish to brownish and this colour changes even to black. If this concentrate is carried forward to prepare the final product, the colour of the cup is dull with milk, it turns pale. The reason for the change of colour could be attributed to the fact that the pH of the aroma and the pH of the concentrate are at variance. The pH of the aroma volatiles is about 7.5 to 8.2 i.e. alkaline and that of the concentrate is 4.8 to 5.4. If the aroma volatiles are directly added to the concentrate, the pH rises suddenly and also forms a low intensity film in the liquor. It is therefore necessary to adjust the pH of the concentrate before the aroma volatiles can be added to it.

The Applicant recommends that any edible acids such as citric acid, fumaric acid or maelic acid etc., may be added to the concentrate prior to aroma addition. Here, citric acid is preferred since it is a commonly available and well tested acid. With this addition, the pH is adjusted to 4.5-4.8. The amount of acid which is added will depend on several factors such as colour development in the concentrate etc. The amount of acid that may be added is about 0.1 to 1% by wt.

As a next step, the aroma volatiles may be added to the acidified concentrate and pH adjusted and blended. The aroma volatiles which are added may be about 4-8% by volume by volume.

The final step is to spray dry the concentrate and pack it for sale. For this, a centrifugal atomiser, spray drier may be used to spray dry the concentrate to form obtain a powder of the beverage. Lower temperatures are maintained to avoid product damage and degradation. Inlet temperature may be maintained at 180-185° C. and outlet temperature at 96-102° C. The powder is fluidised using a fluid bed cooler by injecting air conditioned de-humidified air for obtaining optimum particle size for greater solubility. The powder produced may be used as such or as a liquid concentrate or otherwise in any suitable form. The beverage prepared using this concentrate is substantially free of haze and cloudiness, in that it has residual amount of tea (i.e in very small quantities).

Thus, the salient features of the invention for the preparation of an instant tea product with improved turbidity, better taste and colour are:

a) usage of raw hard water for extraction.

b) usage of flash evaporator after extraction and before clarification for the entrapment and removal/separation of volatiles.

c) addition of pH neutralised tea aroma at concentrate stage.

In order more clearly to describe the nature of the present invention, specific examples are hereinafter described. It should be understood, however, that this is done solely by way of illustration and thus is not limitative of the ambit of the invention or the appended claims.

EXAMPLE

Fresh green leaf plucked from the garden is withered to 70% w/w in withering trough. Withered leaves is given for loose cuts and then transferred to continuous fermenting machine after passing through rotary shifter. Fermentation time is 70 mts. with ½" thickness in bed.

Fermented leaf/black tea or blend thereof are extracted hot at 90-95° C. with 1:10 part of Raw water having 50-100 ppm total hardness in continuous counter current process in decanter. Tea aroma is collected by vapourising the volatiles using flash evaporator and subsequently concentrated and condensed in the aroma recovery unit, collected aroma pH is alkaline 7.8-8.2 which is lowered down to 4.5-5.0 by using an edible acid, such as citric acid.

Hot extract with 4-6% solid w/v is hot clarified in the DMRPX I at 1660 ltrs/hr feed rate with 8 mts. time cycle for discharge at a temperature of 70° C. Hot clarified liquor is first evaporated in falling film evaporator to 8% and polished in DMRPX II. Polished liquor is made concentrate to 36% w/v by CT-6. Evaporator.

Tea aroma is then added back to concentrate at 4% v/v mixed thoroughly and spray dried into powder at Inlet of 176° C. and outlet temperature of 96° C.

The hot water soluble instant powder obtained is instantly soluble in hot water and has very good organoleptic properties. Colour assessment of the liquor is done using a photoelectric calorimeter-111 instrument, where light is passed through a filter in a wave length range of 540-610 nm and peak wave length of 570 nm. All samples of colour analysis is measured at a solid concentration of 0.35% (w/v).

Turbidity of powder is measured by using systronics digital Nephelo Turbidity Meter Model-132 which is an accurate and elegant instrument designed for conducting nephelometric and turbidity measurement of suspended particles and colloids in solution based on the law of Tyndal Effect. The digital display is calibrated in NTU's, accuracy within=2%. Samples are measured at a solid concentration of 0.35% (w/v).

Results of the Some Trials are Shown Below:

| Trial | Colour | Clarity (NTU) | pH | |
|---|---|---|---|---|
| 1 | 0.24 | 2.5 | 5.18 | 206A |
| 2 | 0.22 | 4.5 | 5.26 | 295 |
| 3 | 0.205 | 4.3 | 5.11 | 306A |

Organoleptic tasting of powder is also carried out with a solid concentration of 0.26% (w/v). All the cups are found bright with good tea flavour.

The invention claimed is:

1. A method for the production of hot water soluble instant tea, wherein the tea leaves are selected from oolong or black tea leaves, said method comprising the steps of:
    (a) forming an extract by treating black tea leaves with hard warm water at a temperature in the range of 60 to 105° C.,
    (b) stripping the extract of its aroma volatiles by passing the tea extract through a flash evaporator under partial vacuum, wherein the residence period is about 30 seconds to 360 seconds,
    (c) separating at least about 12% by wt. as insoluble tea solids from the extract by subjecting the extract to repeated clarification and polishing to obtain a clarified concentrate,
    (d) subjecting the clarified concentrate to a pre-evaporation to obtain a second concentrate having 6-10% of soluble tea solids,
    (e) adjusting the pH of the aroma volatiles to 4.5-5.0 by adding an edible acid,
    (f) adding the aroma volatiles obtained in step (b) to the second concentrate, and
    (g) obtaining a substantially moisture free tea powder capable of being reconstituted in hot water to produce instant tea, substantially free of cloudiness and haze.

2. A method as claimed in claim 1 wherein the tea leaves are extracted with hard warm water containing calcium and magnesium salts and having hardness of 10 to 140 ppm and pH of 6.8 to 7.2.

3. A method as claimed in claim 1 wherein extraction of tea leaves is effected at a temperature in the range of 80 to 100° C.

4. A method as claimed in claim 1 wherein the ratio of water to tea leaves is 1:10.

5. A method as claimed in claim 1 wherein the step of polishing includes subjecting the extract of step (c) to repeated centrifugation at an optimum speed of 3000 to 5000 rpm.

6. A method as claimed in claim 1 wherein the edible acid is selected from citric acid, maleic acid or fumaric acid.

7. A process as claimed in claim 1 wherein the amount of edible acid added is 0.1% to 1% by wt.

8. A process as claimed in claim 1 wherein concentrate obtained in step (f) and the powder of step (g) is useful as an additive in the food and beverage industry.

9. An instant tea readily soluble in hot water and produced according to the process described in claim 1.

* * * * *